(12) United States Patent
Davis

(10) Patent No.: US 7,541,784 B2
(45) Date of Patent: Jun. 2, 2009

(54) DUAL VOLTAGE SWITCHING IN POWER GENERATION

(75) Inventor: Dean Arthur Davis, Spanish Fork, UT (US)

(73) Assignee: Endurance Wind Power, Surrey, British Columbia ( * ) Notice: Subject to any disclaimer, the term of this patent is extended or adjusted under 35 U.S.C. 154(b) by 187 days.

(21) Appl. No.: 11/753,627

(22) Filed: May 25, 2007

(65) Prior Publication Data

US 2007/0273336 A1 Nov. 29, 2007

Related U.S. Application Data

(60) Provisional application No. 60/803,349, filed on May 26, 2006.

(51) Int. Cl.
| | |
|---|---|
| *H02P 11/00* | (2006.01) |
| *H02P 9/00* | (2006.01) |
| *H02H 7/06* | (2006.01) |
| *H02J 1/00* | (2006.01) |
| *H02J 3/00* | (2006.01) |
| *H02J 7/14* | (2006.01) |

(52) U.S. Cl. .............................. 322/22; 322/8; 320/123
(58) Field of Classification Search ..................... 322/8, 322/22; 320/123
See application file for complete search history.

(56) References Cited

U.S. PATENT DOCUMENTS

| | | | | | |
|---|---|---|---|---|---|
| 3,624,480 | A | * | 11/1971 | Campbell et al. | 320/123 |
| 3,667,025 | A | * | 5/1972 | Campbell et al. | 320/123 |
| 3,671,843 | A | * | 6/1972 | Huntzinger et al. | 320/123 |
| 3,793,544 | A | * | 2/1974 | Baumgartner et al. | 320/123 |
| 4,045,718 | A | * | 8/1977 | Gray | 320/123 |
| 4,047,088 | A | * | 9/1977 | Himmler | 320/123 |
| 4,100,474 | A | * | 7/1978 | Pfeffer et al. | 320/123 |
| 4,114,082 | A | * | 9/1978 | Scheidler | 320/117 |
| 4,117,390 | A | * | 9/1978 | Iwata et al. | 322/90 |
| 4,153,869 | A | * | 5/1979 | Ragaly | 322/90 |
| 4,492,912 | A | * | 1/1985 | Nowakowski | 320/123 |
| 4,496,897 | A | * | 1/1985 | Unnewehr et al. | 322/25 |
| 4,516,066 | A | * | 5/1985 | Nowakowski | 320/123 |
| 4,656,413 | A | * | 4/1987 | Bourbeau | 322/47 |
| 4,686,442 | A | * | 8/1987 | Radomski | 320/123 |
| 4,723,105 | A | * | 2/1988 | Matouka et al. | 320/123 |
| 4,743,830 | A | * | 5/1988 | Lakey | 320/104 |
| 4,808,842 | A | * | 2/1989 | Hughes | 307/43 |
| 4,816,736 | A | * | 3/1989 | Dougherty et al. | 320/116 |
| 5,164,655 | A | * | 11/1992 | Heavey | 322/8 |
| 5,233,229 | A | * | 8/1993 | Kohl et al. | 307/10.1 |
| 5,355,300 | A | * | 10/1994 | Zinn | 363/146 |
| 6,275,012 | B1 | * | 8/2001 | Jabaji | 322/22 |
| 6,507,506 | B1 | * | 1/2003 | Pinas et al. | 363/79 |
| 6,608,401 | B1 | * | 8/2003 | Walter | 307/39 |
| 6,665,158 | B2 | * | 12/2003 | Walter | 361/18 |

(Continued)

*Primary Examiner*—Nicholas Ponomarenko
*Assistant Examiner*—Pedro J Cuevas
(74) *Attorney, Agent, or Firm*—Thomas Isaacson; Novak Druce & Quigg, LLP

(57) ABSTRACT

A system and method for switching from one voltage to another voltage are disclosed. The system relates to an induction generator or motor that switches between a first voltage and a second voltage. The method comprises transitioning between two or more voltage levels by inserting and removing resistance and capacitance following a systematic timing scheme. The generator/motor may have one or more windings, such as a primary and auxiliary winding.

21 Claims, 7 Drawing Sheets

U.S. PATENT DOCUMENTS

| | | | |
|---|---|---|---|
| 6,841,896 B2 * | 1/2005 | Chiou et al. | 307/28 |
| 6,894,404 B2 * | 5/2005 | Ertzsaenger et al. | 307/10.1 |
| 6,909,201 B2 * | 6/2005 | Murty et al. | 307/10.1 |
| 7,102,331 B2 * | 9/2006 | Walter et al. | 322/8 |
| 7,170,261 B2 * | 1/2007 | Walter et al. | 322/8 |
| 7,180,205 B2 * | 2/2007 | Wirdel | 307/10.1 |
| 2003/0227786 A1 * | 12/2003 | Chiou | 363/142 |
| 2004/0130214 A1 * | 7/2004 | Murty et al. | 307/66 |
| 2004/0164716 A1 * | 8/2004 | Walter et al. | 322/8 |
| 2007/0080669 A1 * | 4/2007 | Poore et al. | 322/22 |

* cited by examiner

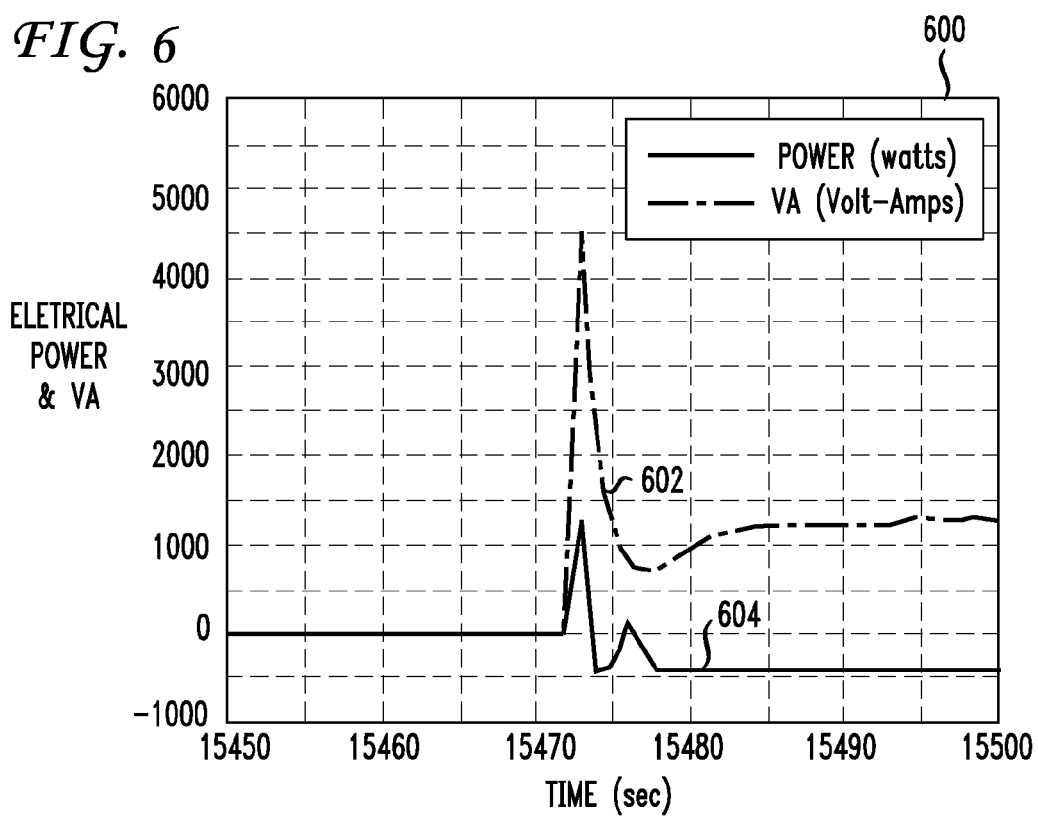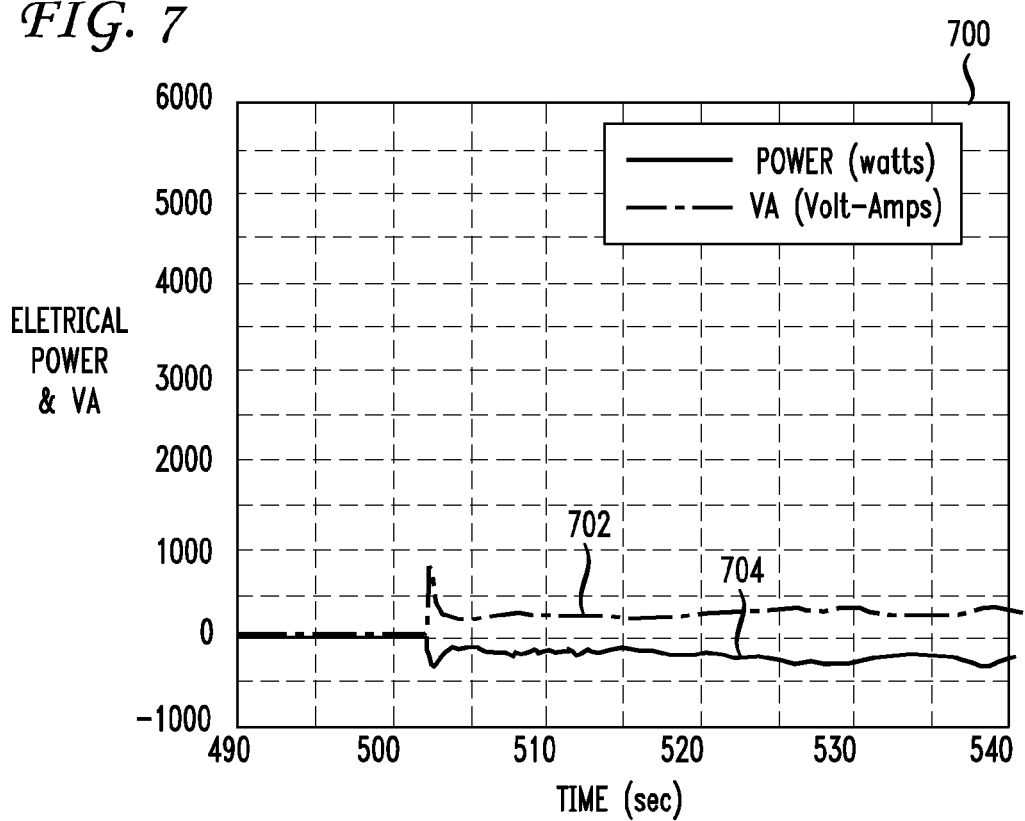

DUAL VOLTAGE SWITCHING IN POWER GENERATION

PRIORITY CLAIM

The present application claims priority to U.S. Provisional Application No. 60/803,349 filed May 26, 2006, the content of which is incorporated herein by reference.

BACKGROUND OF THE INVENTION

1. Field of the Invention

The present invention generally relates an induction generator or motor which is capable of direct connection to the electrical grid or other variable load or power source. One example of such a generator is a wind turbine.

2. Introduction

The present application relates to induction generators and motors. One example of these types of devices is the wind turbine. Small wind turbines are increasingly being used for residential generation of power. A wind turbine is a machine that converts the kinetic energy of the wind into mechanical energy. The mechanical energy is then typically converted into electricity. Wind turbines may rotate on a horizontal or vertical axis. Most small wind turbines employ permanent magnets generators to create "wild-AC" which is a variable voltage having a variable frequency power. This power must first be converted to DC and then back AC via an inverter. The inverter then produces standard 60 cycle AC synchronized to the power grid, at 120V or other common voltage. This voltage is required to be of a given quality and synchronized with the utility grid power in order for the power to be used seamlessly in the home. Induction generators offer a cost-effective alternative to inverters for creating grid-compatible power. What is needed in the art are improvements to make induction generators more efficient in grid-connected, in particularly at low power levels.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present inventors have developed an induction generator/motor that may be used by way of example in a wind turbine that is preferably small and used for residential purposes. The induction generator or motor is connected to a variable power source or variable load. The generator or motor may be a dual winding (for a two phase generator/motor) or a single winding (for a single phase generator/motor). More windings may be employed as well. While in general the invention applies to any induction generator or motor, the exemplary embodiment is described in terms of a wind turbine. This wind turbine is unique to prior art for small (residential size) wind turbines primarily due to its use of induction generator for direct grid connection. By using an induction generator, grid compatibility and synchronized power is generated by default. This is because the induction generator has its electrical field induced by the grid, resulting in generated power that is at the correct voltage and current at the correct frequency.

This allows the wind turbine of the present invention to eliminate the inverter resulting in a significant reduction in installed costs as well as increasing the reliability of the system. The inverter has historically been a problem when used in connection with a wind turbine because of a less than ideal power regulation found on many small wind turbines (i.e. the turbine overpowers the inverter).

The present invention has several embodiments. The embodiments may include, without limitation, an induction generator or motor (such as a wind turbine) used according to the principles disclosed herein. An exemplary method comprises operating an induction generator according to the principles herein. An exemplary computing device stores a computer program for controlling an induction generator/motor and a computer readable medium embodiment stores a computer program for controlling an induction generator/motor. The induction generator is driven by a variable power source or drives a variable demand load. Specific aspects of the invention include an induction generator that produces voltages (e.g. 120 volts and 240 volts) according to the source or load it is connected to, an available power source (e.g. the wind), and a mechanism to switch between at least two voltages. A standard single-phase generator is preferably used with a primary winding and an auxiliary winding to assist the generator/motor to start and to smooth the electrical field for balance. Without the principles of the invention, any standard 240V motor could be wired to a hot and neutral connector and run at 120V but in that configuration it could only have $\frac{1}{4}^{th}$ the output.

Another embodiment relates to a dual voltage generator having a first leg variably connected to a first hot line and a second leg switched between a second hot line and a neutral line. The dual voltage generator comprises, for switching from a low voltage to a high voltage, a module configured to insert a resistor between the first leg and the first hot line and to disconnect a neutral line from a second leg, a module configured to close a first switch, after the first period of time to connect the second hot line to the generator and a module configured to open a second switch, after a second period of time and close a third switch to remove the resistor from being between the first leg and the first hot line. FIGS. 1A and 1B discussed below illustrate several structures which may be implemented to enable the dual voltage switching.

An exemplary method embodiment comprises switching from one voltage to another voltage by transitioning smoothly between two or more voltage levels by judicious insertion and removal of resistance and capacitance following a prudent, systematic timing scheme.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 illustrates the large spikes in volt-amps and electrical power switching the generator on at 240 volts;

FIG. 7 illustrates the smaller spikes in volt-amps and electrical power switching the generator on at 120 volts;

DETAILED DESCRIPTION OF THE INVENTION

Figure 1A:
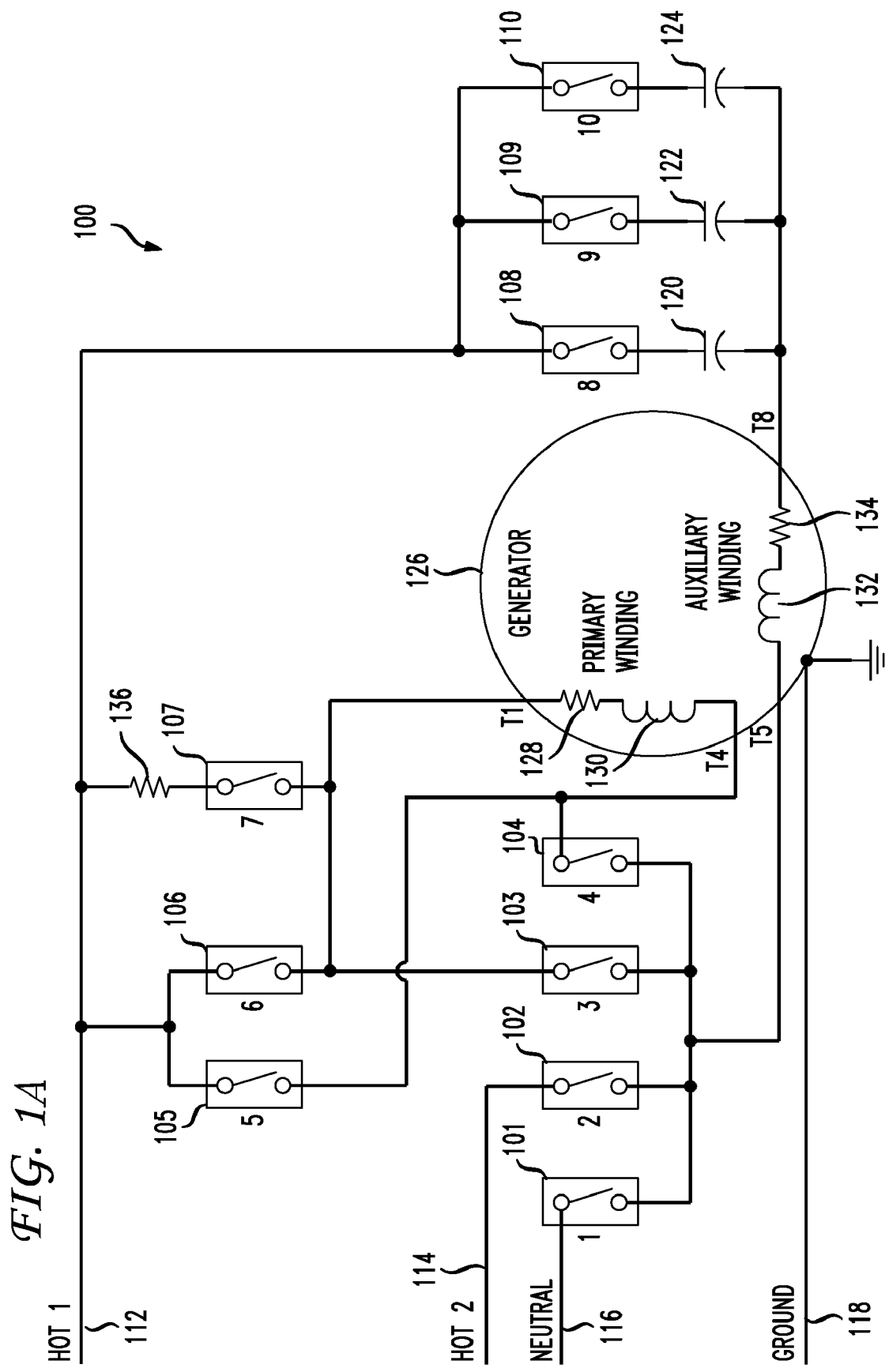
FIG. 1A illustrates a wiring diagram with example locations for relays for dual voltage switching, motor starting and connection of run and start capacitors.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Disclosed is an induction generator or motor which may be driven by a variable power source or drive a variable demand load. An example application is a wind turbine that is preferably applied in a residential setting. However, while the preferred embodiment of the invention is a small wind turbine useful in this context, the principled disclosed herein will apply to any induction generator or motor.

The application of induction generation in the context of small wind turbines is an example of novel approach of the invention. Many large wind turbines use induction generators. This is primarily due to the fact that larger wind turbines are designed to produce utility compatible power and put this power on the utility grid. On the other hand, small wind turbines have typically been designed for off-grid usage. These turbines have found their largest market in remote power systems (cabins, RV's, sailboats, and remote villages) where batteries and inverters are necessary to store and run normal household appliances.

Many of the larger wind turbines likely generate 3-phase power. This is a very efficient means of generating power. 3-phase generators are more efficient and less expensive when compared with single-phase generators. They also run smoother and quieter (compared to single-phase generators) since the rotating electric field is always balanced.

Generating single-phase power with an induction generator has the same idiosyncrasies as using a single-phase induction motor. Most common motors in household appliances such as refrigerators, washers, dryers, and air conditioning are single-phase induction motors. These idiosyncrasies include: A start capacitor must be used in conjunction with an auxiliary winding to get the motor started. The start capacitor must be removed from the system once the motor nears its rated speed. This is often accomplished with a centrifugal switch; and a run capacitor is often used to smooth the running operation, increase the efficiency, and decrease the reactive power draw.

Another characteristic of any induction generator is that it tends to have low generating efficiencies when generating at low power levels when compared with its rated power. This is likely exacerbated when generating single-phase.

Although energy suppliers would like to generate 3-phase power, for most residences, 3-phase power is not available. Instead, they have single-phase power, often at both 120V and 240V. There is a clear need for single-phase power generation at a local level.

Dynamometer testing shows that although one could generate at higher power levels with generator efficiencies near 85%, efficiencies of 70% are seen when generating at ~25% of rated power and as low as 35% when generating at 6% of rated power. For many types of generators that would only operate near rated power, this does not pose a problem. But for a wind turbine, regulating the input power (the wind) is not an option. Even for most windy sites, a significant number of hours per year experience lower wind speeds. The wind as input power provides an example of the variable power source conditions under which the induction generator or motor would operate.

Fortunately, by operating an induction generator at a lower voltage a system, in effect, changes its rated power. Using the present wind turbine generator as an example, if the wind turbine has a rated power of 3,750 watts (5 HP) when generating at 240V, it would be rated just a 938 watt generator when operating at 120V. This is because the power increases with the square of the voltage, so half the voltage is $\frac{1}{4}^{th}$ the power. Table 1 highlights how the generating efficiencies are improved on the low end while generating at the lower (120V) voltage. The table shows that by using the same generator at two different voltages, the generating efficiencies can be dramatically changed (or improved) at the lowest generating power levels. This system is called the DVS (dual voltage switching) system.

TABLE 1

| Operating voltage | Rated electrical power output (watts) | Generating efficiency at 225 watts output power | Generating efficiency at 938 watts output power |
|---|---|---|---|
| 240 V | 3,750 | 35% | 70% |
| 120 V | 938 | 70% | 83% |

Others have overcome the low generating efficiencies in a few different ways. For example, some use two separate generators, one large and one small. Others have chopped the waveform, effectively creating lower voltages. Some use a triac controller and a company named Enerpro sells black boxes that perform this task. Some users will accept the lower efficiencies and only generate at the higher voltage.

There are drawbacks to all of the above approaches. Using two generators adds cost and compounds reliability problems not only due to the second generator but the required additional driveshaft, coupling and extra wiring and bearings.

Chopping the waveforms requires additional cost in power electronics and additional reliability concerns for these components. The triac controller is difficult to find in the market place. Further, the triac controller is not fully tested or verified and it cannot be purchased off-the-shelf. The Enerpro units do not work with capacitance in the system, which is required for smooth single-phase generation and motor starting.

In order to overcome the deficiencies in the various approaches of the prior art, the inventors have invented a dual-voltage switching (DVS) system. There are many benefits to the DVS system. One advantage is the improved low-end efficiency but other benefits exist as well. These benefits are realized by having the lower power and current draw of the 120V operation while still having the high power capacity afforded by running at 240V.

When connecting the generator at the full 240V at synchronous speed (1,800 rpm), there is a significant current draw and corresponding torque spike. The current draw results (when on a weak grid) in a voltage sag which can be noticed in a "light-flicker". The torque spike can be heard when standing near the turbine as a large thump at the turbine nacelle. This indicates an additional load on the drivetrain that, over time, may cause reliability issues in the drivetrain. Both of these problems are dramatically reduced when connecting at the lower 120V.

In one aspect of the invention, the inventors motor start the wind turbine using the generator as a single-phase induction motor. A fixed pitch wind turbine will have its rotor blades in deep aerodynamic stall when not rotating or slowly rotating in light winds. This results in a very poor aerodynamic performance (the blades perform very nearly as if they were flat boards). If the rotor can be spun up, the blades will come out of stall and as a result the rotor can produce power. By motor starting in light winds the system can more quickly produce power in lower winds. This lowers cut-in (the minimum wind speed necessary to produce power) resulting in higher energy capture and more run time, both things the customer wants. When switching on the motor at 240V, there is a large current draw and rapid acceleration (much faster than necessary or desired) of the rotor up to synchronous speed. This presents the same problems of high current draw and corresponding voltage sag combined with higher drivetrain torques. By motor starting at 120V all these issues are significantly reduced.

The present DVS system, as well as motor starting and grid connection, is all accomplished via relays and a programmable logic controller (PLC). This hardware is available from various manufacturers as would be known by one of skill in the art. Any suitable switching option may be used, such as mechanical relays or SSRs.

FIG. 1A illustrates an example relay layout for dual voltage switching, motor starting and grid connection. The following details each relay which is represented by a symbol which is a rectangular box with either a connection line or an open switch symbol.

As is shown in the relay layout 100 of FIG. 1A, relay 101 connects the T5 generator line to the grid neutral line 116. Relay 102 connects the T5 generator line to grid Hot-2 114. Relay 103 connects the T1 generator line to the grid N 116 for motor starting. Relay 104 is required to disconnect the T4 generator line from either Hot line 112 or Hot-2 line 114 during starting, for example, when relay 103 is closed. Relay 105 connects the T4 generator line to grid Hot-1 112 for motor starting. Relay 106 connects T1 generator line to grid Hot-1 112 during normal operation. It is also used to disconnect the Hot-1 line to the T1 generator line while motor starting. Relay 107 is used to apply a small resistor 136 into the system briefly to smooth transition between 120V and 240V (or any other two voltages). Relay 108 is used to install or to remove the run capacitor 120 into the electrical system. Preferably, relay 109 is not used, but if it is used it may be used to install or remove line capacitor 122 into the electrical system. Relay 110 is used to install or remove the start capacitor 124 into the electrical system and typically only used during motor starting.

Figure 1B:
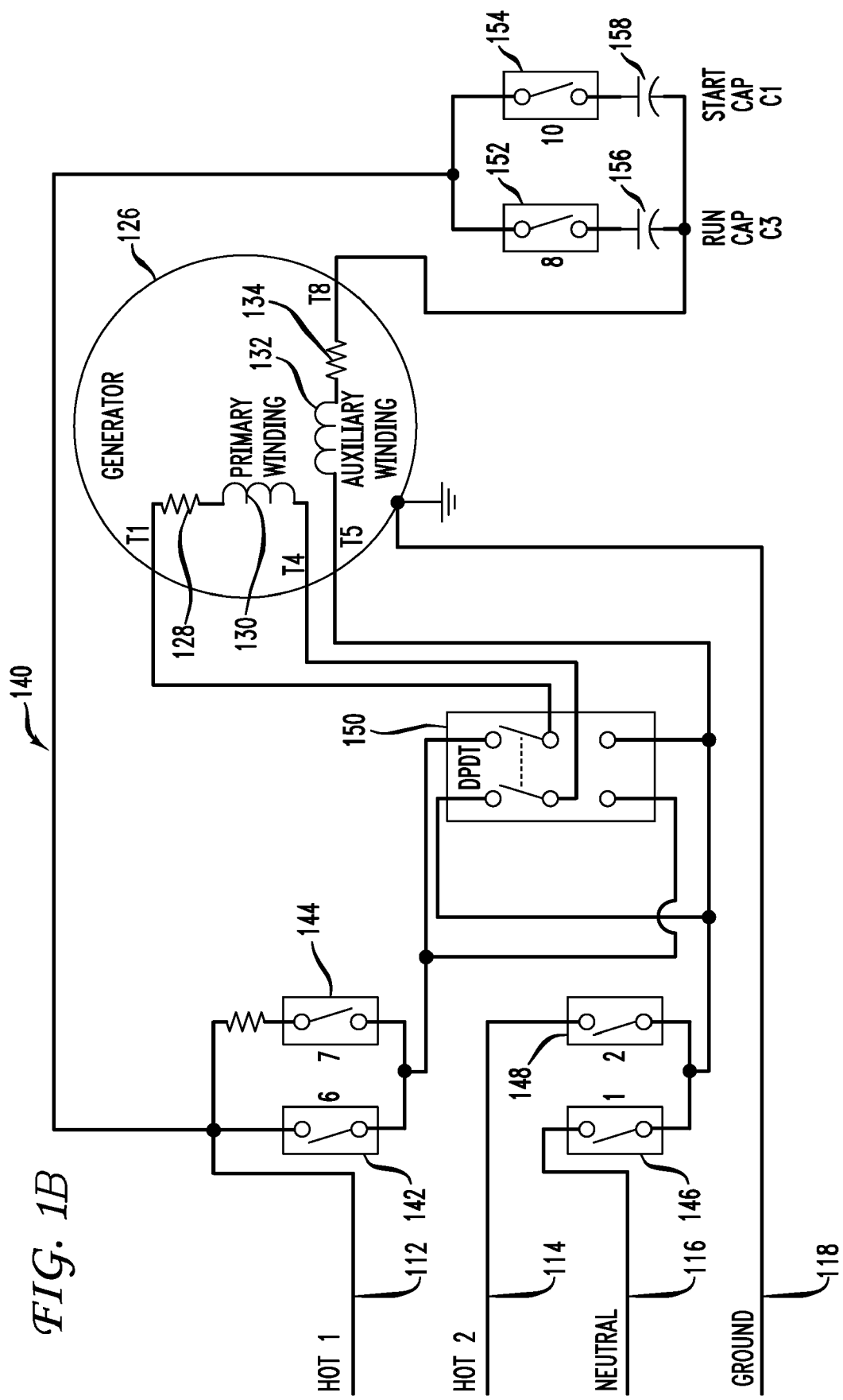
FIG. 1B illustrates another exemplary wiring diagram.

A double-pole double-throw (DPDT) relay may be used in place of some of the features of FIG. 1A. FIG. 1B may be used as a reference to what components a DPDT would replace. In this case, a DPDT would swap the primary T4 and auxiliary T5 windings during motor starting. For example, when the DPDT relay is switched on, relay 106 connects the T4 generator line to grid Hot-1 112, and relay 101 connects the T1 generator line to grid neutral line 116 for motor starting. During normal operation, the DPDT is not switched and hence relay 106 connects T1 generator line to grid Hot-1 112 and relay 101 connects T4 generator line to grid neutral line 116 during normal operation at 120V. Relay 107 is used to apply a small resistor 136 into the system briefly to smooth transition between 120V and 240V. Relay 108 is used to install or to remove the run capacitor 120 into the electrical system. Relay 110 is used to install or remove the start capacitor 124 into the electrical system and typically only used during motor starting.

The most basic voltage switching system requires just two relays 101, 102 in FIG. 1A or relays 146, 148 in FIG. 1B. These two relays would then be used to connect the one leg (T4) of the generator to either Hot-2 114 or neutral 116 resulting in either 240V or 120V operation, respectively. Bench testing showed this system to work but current spikes and voltage sags are reduced by switching in a power resistor and by switching in and out the run capacitor. The timing and sequence of the switching was also shown to be valuable for protection of the relays and for smoothing the current spikes. As a result, the preferred DVS system actually uses 5 relays 101, 102, 106, 107, 108 in FIG. 1A or 146, 148, 142, 144, and 152 in FIG. 1B. The sequence is different for switching from 120V up to 240V or for switching down from 240V to 120V.

In order to upswitch from 120 volts to 240 volts the preferred sequence follows:

1. For FIG. 1A, open relay 101, close relay 107, open relay 106. For FIG. 1B, open relay 146, close relay 144, open relay 142. This inserts the resistor into the H1 leg 112 and disconnects the N leg 116.

2. Wait 31 ms or two full sine-wave cycles. This is a preferable amount of time, but other periods of time may be applicable as well, both slower and faster than 31 ms.

3. Close relay 102 in FIG. 1A or relay 148 in FIG. 1B to connect H2 114 to generator T5 leg.

4. Wait preferably ¼$^{th}$ second. A slower or faster amount of time may be in the place of ¼$^{th}$ second.

5. Open relay 107, close relay 106 in FIG. 1A, or open relay 144, close relay 142 in FIG. 1B to remove resistor from the H1 leg 112.

FIG. 1B illustrates another example relay layout for dual voltage switching, motor starting and grid connection. The following details each relay which is represented by a symbol which is a rectangular box with either a connection line or an open switch symbol.

As is shown in the relay layout 140 of FIG. 1B, relay 146 connects the T5 generator line to the grid neutral line 116. Relay 148 connects the T5 generator line to grid Hot-2 114. The DPDT relay 150 swaps the T4 and T1 leads of the primary windings during motor starting. For example, when the DPDT relay is switched on for motor starting, relay 142 connects the T4 generator line to grid Hot-1 112, and relay 146 connects the T1 generator line to grid neutral line 116. During normal operation at 120V, the DPDT relay 150 is not switched and hence relay 142 connects T1 generator line to grid Hot-1 112 and relay 146 connects T4 generator line to grid neutral line 116. During normal operation at 240V, the DPDT relay 150 is not switched and hence relay 142 connects T1 generator line to grid Hot-1 112 and relay 148 connects T4 generator line to Hot-2 114. Relay 144 is used to apply a small resistor 136 into the system briefly to smooth transition between 120V and 240V. Relay 152 is used to install or to remove the run capacitor 156 into the electrical system. Relay 154 is used to install or remove the start capacitor 158 into the electrical system and typically only used during motor starting.

An example method of down switching from 240V to 120V may be performed as follows, with reference to the layout of FIG. 1A and FIG. 1B:

1. Open relay 102, close relay 107, open relay 106, and open relay 108 in FIG. 1A; or open relay 148, close relay 144, open relay 142, and open relay 152 in FIG. 1B to insert the resistor into H1 leg 102 and remove the run capacitance.

2. Wait 31 ms (2-full sinewave cycles) or some other time frame.

3. Close relay 101 in FIG. 1A or close relay 146 in FIG. 1B to connect N 106 to generator leg T5.

4. Wait ¼$^{th}$ second or some other time frame.

5. Open relay 107, close relay 106 in FIG. 1A, or open relay 144 and close relay 142 in FIG. 1B to remove the resistor from H1 leg 112.

6. Wait ⅛$^{th}$ second or some other time frame.

7. Close relay 108 in FIG. 1A or close relay 152 in FIG. 1B to place the run capacitance back into system.

All of the activities associated with the wait times, the run capacitance and the resistor tend to smooth the transition between voltages reducing the current spikes and the voltage sags. The times discussed above are the preferred times but other times are contemplated as well.

Figure 2:
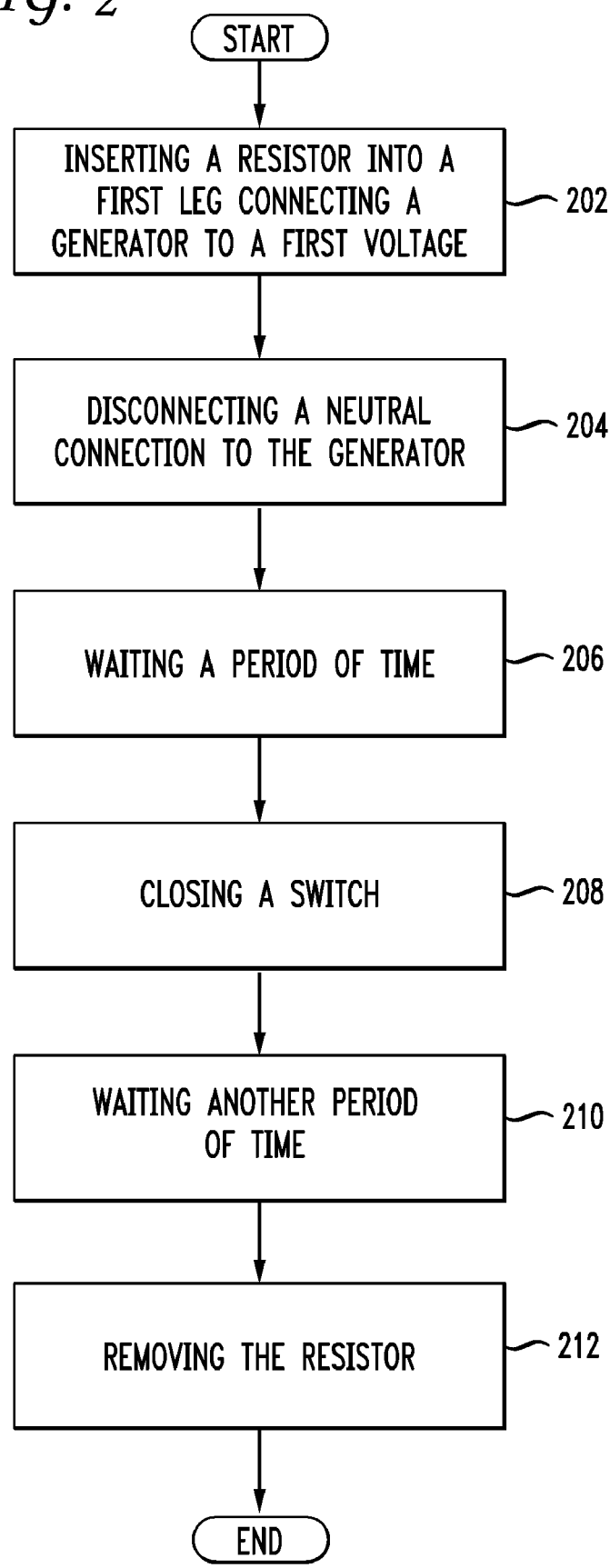
FIG. 2 illustrates a method embodiment of the invention.

Embodiments of the invention relate to an induction generator/motor such as wind turbine. Other embodiments include a system, a method and a computer-readable medium for controlling a computing device or an induction generator/motor to perform the steps of the invention. For example, the method comprises as is shown in FIG. 2, a method of switching voltages in a generator, the method comprising, inserting a resistor into a first leg connecting a generator to a first voltage (202) and disconnecting a neutral connection to the generator (204), waiting a period of time (206), closing a switch (208), waiting another period of time (210) and removing the resistor (210). The system may comprise a generator or a generator with the various switches, resistor and capacitors alone or as part of a larger configuration.

Figure 3:
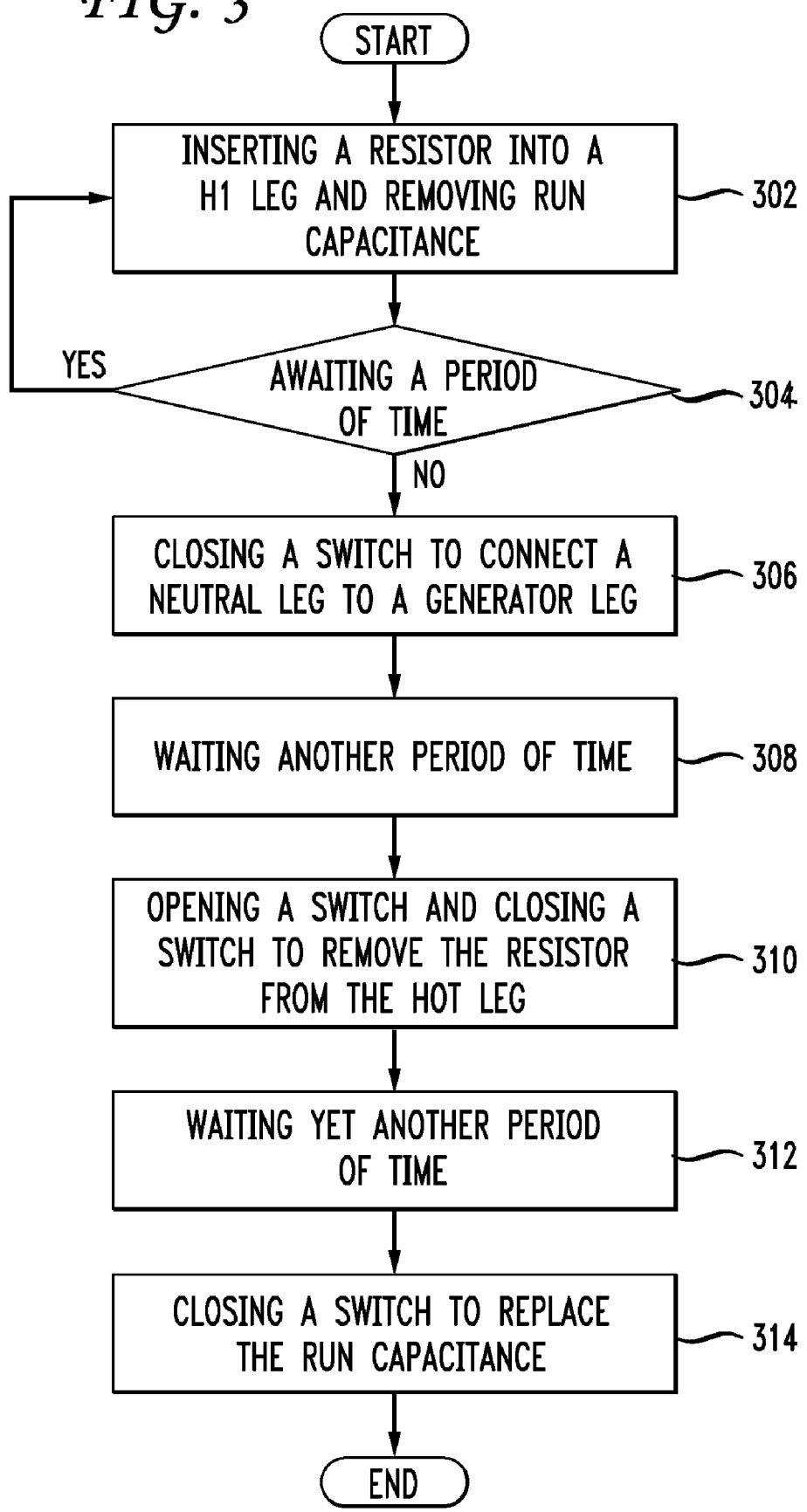
FIG. 3 illustrates another embodiment of the invention related to down switching from 240 volts to 120 volts.

FIG. 3 illustrates a method embodiment of the invention comprising inserting a resistor into a H1 leg and removing run capacitance (302, 304), waiting a period of time (304), closing a switch to connect a neutral leg to a generator leg (306), waiting another period of time (308), opening a switch and closing a switch to remove the resistor from the hot leg (310), waiting yet another period of time (312) and closing a switch to replace the run capacitance (314). These various periods of time may be the same or unique depending on the circumstances.

Example materials required for the voltage switching are as follows. Relays (solid-state or otherwise, or switches) which may include 4 relays for switching the voltage and the resistor in and out. These relays may be SSRs (75A) and are preferably oversized to allow for some fatigue damage that may be occurring from the current spikes while switching. Although the current spikes have been reduced dramatically, the large number of spikes (over the turbine's design life) still gives some concern. All of the SSRs are preferably zero-crossing turn-on SSRs or any other type of suitable SSR. A high-resolution generator speed sensor is employed. All decisions for the voltage switching are based on rotor speed (or with a constant gear ratio gearbox, generator speed). This speed sensor information is sent to the programmed logic controller (PLC) or some other type of computer controller may also used. The PLC uses the speed information to evaluate which voltage should be active at any given time. The PLC then controls the relays with digital outputs. Those of skill in the art will recognize equivalent structures that may not be solid state.

Figure 4:
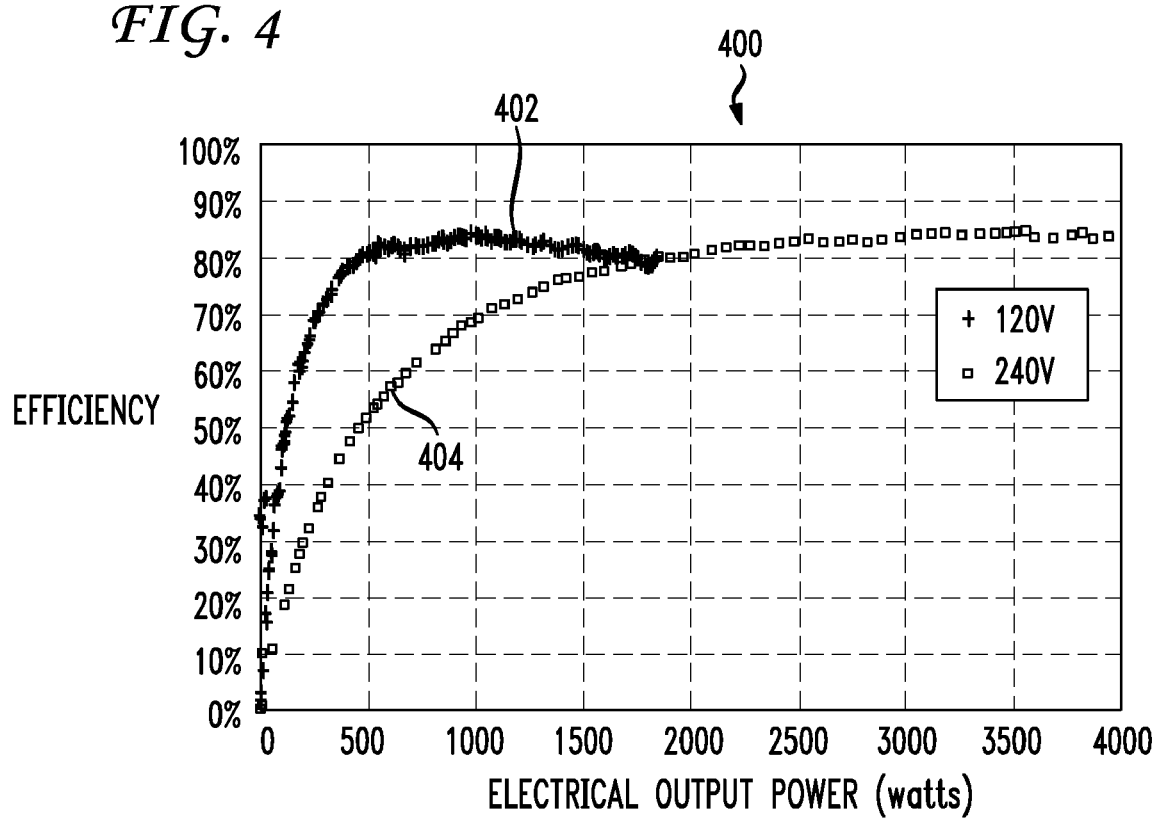
FIG. 4 illustrates generating efficiencies vs. output electrical power at 120 volts and at 240 volts and the optimal point to transition between the two.

An extensive amount of testing was performed for refining the DVS system. Some of these test results are discussed next. FIG. 4 shows a graph 400 of the generating efficiencies vs. output electrical power at both 120V 402 and 240V 404. This figure shows how the 120V operation results in much higher efficiencies when generating at the very low power levels. The 120V operation is not capable of generating much beyond 1,500 watts, where the system switches to 240V.

Figure 5:
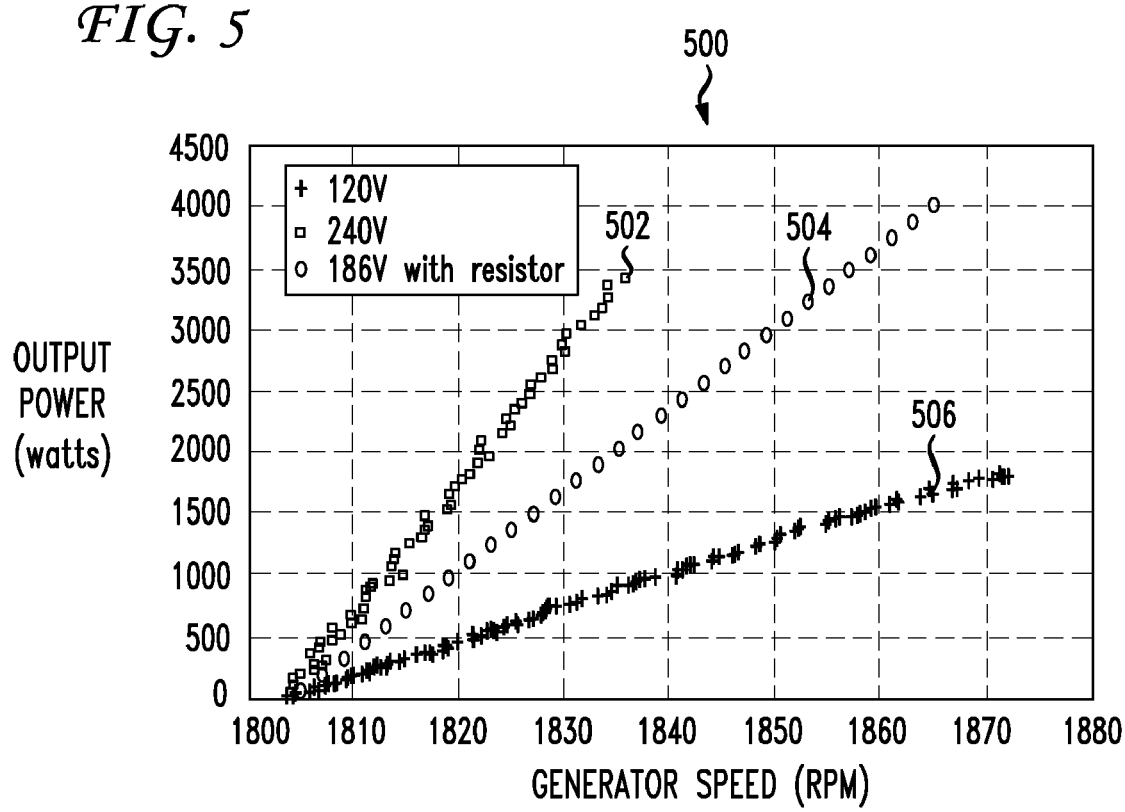
FIG. 5 illustrates the different voltages as the generator power vs. speed curve changes.

FIG. 5 illustrates a graph 500 that shows while generating at the different voltages, the generator power vs. speed curve changes. The plot 500 shows that the slip of the generator changes when operating at different line voltages. This amounts to higher slip at 120V and lower slip at 240V. Therefore, when switching voltages, the generator has to change speed to come back to equilibrium with the new voltage. As an example, if the system were operating at 120V and 1,000 watts, the generator speed would be 1,840 rpm. If the generator were reconnected at 240V the generator would output ~4,000 watts (holding the speed constant and jumping up to the 240V curve). Assuming the wind did not gust at that exact moment this would be too high a torque for the rotor to sustain and the rotor speed would slow to around 1,813 rpm where again the system would be producing 1,000 watts of output power.

The resistor causes a voltage drop and as a result adds a line 504 in between the two lines (shown on the graph as the 186V line—theoretical not measured). Using the example above but with the addition of the resistor, the system starts at 120V 506 running at 1,840 rpm and 1,000 watts, then switch to 240V 502 but with the resistor in the circuit. This causes the power to instantaneously jump to 3,000 watts where equilibrium will quickly be reestablished with a rotor speed of 1,820. After a brief delay, the resistor is switched out again resulting in a power jump to 1,700 watts before the rotor again slows to 1,812 rpm. By switching with the resistor as an intermediate step current spikes are reduced and the voltage sags making the transition smoother.

Another way of smoothing the voltage transitions was to remove or keep in place the run capacitor 108. Since the capacitor acts as a storage device, the inventors experimentally found that by removing the capacitor 108 from the circuit before down-switching, it reduced the current spikes. The opposite was also true on the up-switching. When up-switching, it was smoother to leave the run capacitor 108 in the circuit.

When using an induction generator in the context of a wind turbine, it is necessary to disconnect the generator from the grid when the winds are below cut-in. This is due to the fact that an induction generator becomes an induction motor once the generator speed is reduced below synchronous speed (1,800 rpm for example). If the generator stays connected (without significant wind) the wind turbine will become a fan and consume electricity. As a result, the generator is disconnected from the grid once the generator speed drops below synchronous speed. In variable light winds, this means that the control system connects and disconnects the wind turbine from the grid often. Some hysteresis is built into this process so that the connection isn't chattering and instead, once on-line, will stay on-line even if motoring for a given time period. Once off-line (freewheeling), the system goes on-line whenever the speed increases above synchronous without delay. This switching, between freewheeling and generating, is smoother when switching on at 120V as opposed to 240V. This represents yet another benefit of the DVS system.

FIGS. 6 and 7 show time series plots 600, 700 where the generator is being connected to the grid (coming on-line) at both voltages. FIG. 6 illustrates switching the generator on-line at 240 volts. Line 602 represents the voltage amps and line 604 represents the power. FIG. 7 illustrates switching the generator on-line at 120 volts. As shown in FIG. 7, line 702 represents the volt amps and line 704 represents the power. From these figures, one can see that the spike is much smaller when switching at 120V, especially for the volt-amps (VA). For these two figures, the VA is more than 5.5 times when switching on at 240V compared with 120V. This represents a large current spike that has been avoided with the DVS system.

Figure 8:
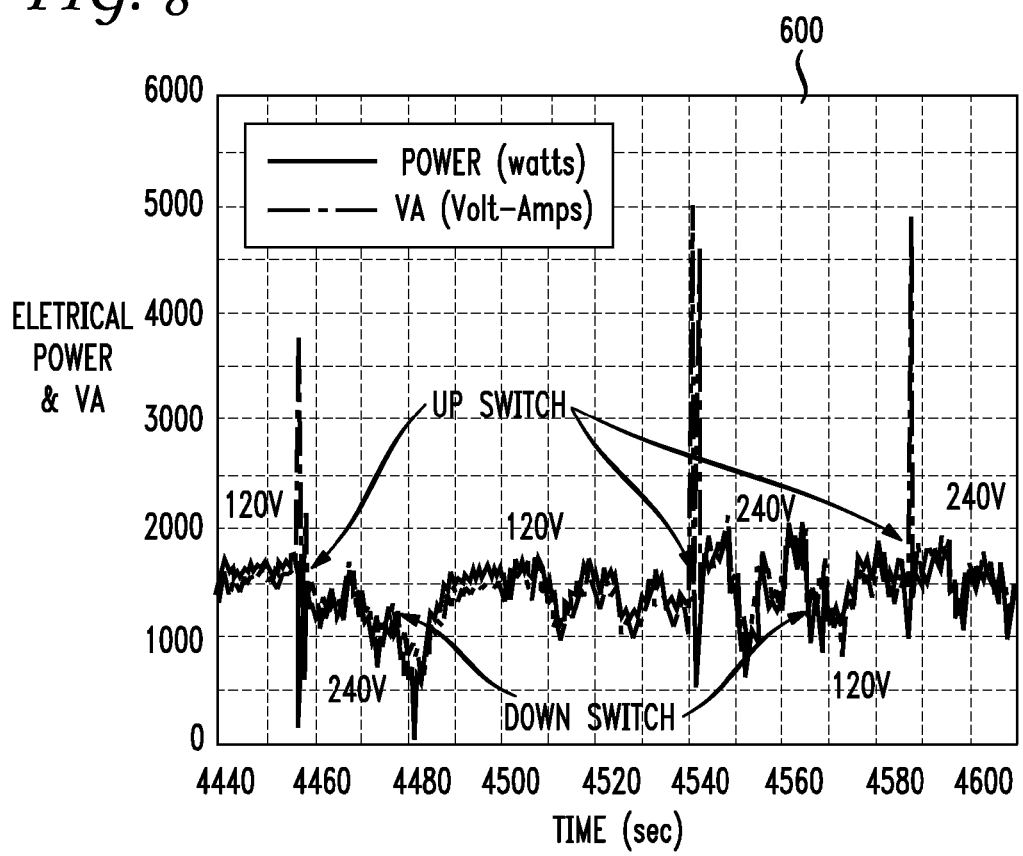
FIG. 8 illustrates the electrical power and volt-amps of a prototype dual voltage switching system used in variable wind conditions.

FIG. 8 illustrates the running of a turbine with the DVS system active in variable winds. The DVS system has been implemented on a prototype test turbine currently in operation. FIG. 8 shows a time series of just under 3 minutes (170 seconds). Because the winds are fluctuating near the switching setpoint (approximately 1,500 watts), the turbine is switching back and forth between the two voltages. Both up and down switches can be seen on the power data, highlighted with sudden drops in power represented by the down spikes. The VA shows very little spiking on a down-switch but shows a large spike when switching up. These spikes have not caused any problems for the relays or with voltage sags (dimming or flickering of the lights). When the winds are consistently higher or lower than for the case shown in FIG. 8, voltage switching will not occur and the generator operates at a single voltage.

The current DVS system capitalizes on the fact that most homes in the United States have two different single-phase voltages. These are 120V and 240V. Some possible variations of the system follow.

The single-phase induction generator could easily be swapped with a three-phase induction generator. There may be one or more windings associated with the generator/motor. For example, there may be one primary winding and one auxiliary winding. The three-phase generator/motor may provide smoother running and higher efficiencies without the need for capacitors. If the generating location had two different 3-phase voltages, then one could also use the inventive DVS system. One possible scenario would be that the facility would have 460V and 230V. Thus, voltages in other countries may utilize the principles set forth herein.

If a facility had only a single three-phase voltage, then one might consider using a transformer to get the second voltage. The cost of this transformer and the associated losses would determine if this would be a cost effective way of creating the second (lower voltage) allowing the facility to use the DVS system. The benefits of going on-line smoother and more gradual motor starting may still result in a benefit to the overall wind turbine system even if the additional costs and losses of the transformer cancel out any benefits of more energy capture. The above-mentioned transformer could be used on a single-phase system as well.

Although the inventors have implemented this on a wind turbine one can see that the DVS system could be beneficial in other generating operations where the input power is variable (e.g., solar powered engines or variable flow hydroelectric plants). Thus, the principles are not confined to wind turbines.

Because induction motors are the most common electromechanical machine produced, there may be an application to improve overall efficiency of a motor application by running it at a lower voltage when low power is required then switching to a higher voltage once the power requirement is raised. One possible example is an industrial process where the machine is idling for long periods of time but is required to be on and ready to provide higher power at short notice. Idling at the higher voltage will result in higher energy consumption than is necessary.

The invention may be one of any embodiment of a system, method or computer readable medium storing instructions for controlling a computer device. The computing device may be a small computing device such as a single board computer (BL25-10) from Z-World. The computing devices may have the known or future developed components such as a system bus, computer processor, memory, communication means, hard disk storage and so forth. As can be appreciated, any computing device may do. An exemplary system or computing device is shown in FIG. 9.

Figure 9:
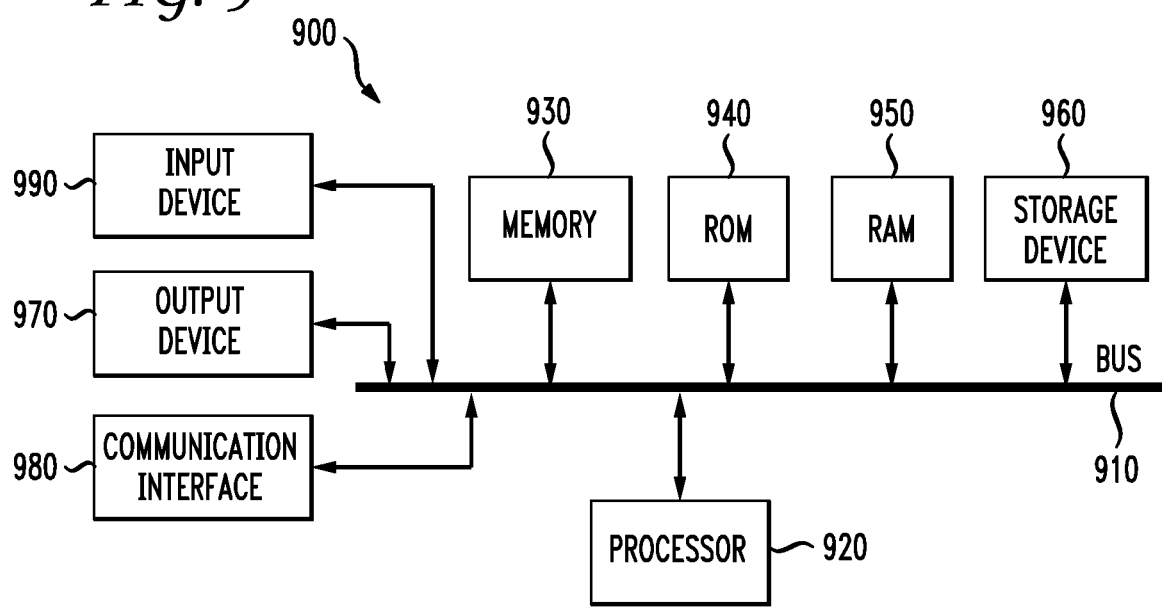
FIG. 9 illustrates a basic system or computing device embodiment of the invention.

With reference to FIG. 9, an exemplary system for implementing the invention includes a general-purpose computing device 900, including a processing unit (CPU) 920 and a system bus 910 that couples various system components including the system memory such as read only memory (ROM) 940 and random access memory (RAM) 950 to the processing unit 920. Other system memory 930 may be available for use as well. It can be appreciated that the invention may operate on a computing device with more than one CPU 920 or on a group or cluster of computing devices networked together to provide greater processing capability. The system bus 910 may be any of several types of bus structures including a memory bus or memory controller, a peripheral bus, and a local bus using any of a variety of bus architectures. A basic input/output (BIOS), containing the basic routine that helps to transfer information between elements within the computing device 900, such as during start-up, is typically stored in ROM 940. The computing device 800 further includes storage means such as a hard disk drive 960, a magnetic disk drive, an optical disk drive, tape drive or the like. The storage device 960 is connected to the system bus 910 by a drive interface. The drives and the associated computer readable media provide nonvolatile storage of computer readable instructions, data structures, program modules and other data for the computing device 900. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 900, an input device 990 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 970 can also be one or more of a number of output means. In some instances, multimodal systems enable a user to provide multiple types of input to communicate with the computing device 900. The communications interface 980 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 9 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A dual voltage generator having a first leg variably connected to a first hot line and a second leg switched between a second hot line and a neutral line, the dual voltage generator comprising, for switching from a low voltage to a high voltage:
    a module configured to insert a resistor between the first leg and the first hot line and to disconnect a neutral line from a second leg;
    a module configured to close a first switch, after the first period of time to connect the second hot line to the generator; and
    a module configured to open a second switch, after a second period of time and close a third switch to remove the resistor from being between the first leg and the first hot line.

2. The dual-voltage generator of claim 1, wherein the dual voltage generator is driven by a variable power source.

3. The dual-voltage generator of claim 2, wherein the variable power source is one of a wind turbine, a solar powered engine or a variable flow hydroelectric plant.

4. The dual-voltage generator of claim 1, wherein the dual-voltage generator generates one of single phase power or three phase power.

5. The dual-voltage generator of claim 1, wherein when the first line is one of a 120V, 230V or 460V line.

6. The dual-voltage generator of claim 1, wherein the module configured to insert a resistor, the module configured to close the first switch and module configured to open the second switch, switch the dual-voltage generator from a lower voltage to a higher voltage.

7. The dual-voltage generator of claim 1, further comprising for switching from high voltage to a low voltage:
    a module configured to insert the resistor between the first leg and the first hot line and to remove a run capacitance from between the first hot line and a connection to an auxiliary winding;
    a module configured to connect the neutral line to the second leg after a period of time;
    a module configured to remove the resistor from between the first hot line and the first leg after a period of time; and
    a module configured to insert the run capacitance back in between the first hot line and the connection to the auxiliary winding.

8. A dual-voltage generator having a first leg always connected to a first hot line and a second leg switched between a second hot line and a neutral line, the dual-voltage generator comprising:
    a first module configured to switch the dual-voltage generator from lower voltage to a higher voltage, the first module performing the steps:
        inserting a resistor between the first hot line and the first leg;
        disconnecting the neutral line from the second leg of the dual-voltage generator;
        after a first period of time, connecting the second hot line to the second leg; and
        after a second period of time, removing the resistor.

9. The dual-voltage generator of claim 8, further comprising a second module configured to switch the dual-voltage generator from a higher voltage to a lower voltage, the second module performing the steps:

inserting the resistor in between the first hot line and the first leg;

removing a run capacitance between the first hot leg and an auxiliary winding;

removing the hot line from the second leg;

connecting the neutral line to the second leg after a third period of time;

removing the resistor after a forth period of time;

inserting the run capacitance back into the system after a fifth period of time.

10. The dual-voltage generator of claim 9, wherein the first, second, third, forth and fifth periods of time may or may not be the same.

11. The dual-voltage generator of claim 9, wherein the steps of inserting the resistor between the first hot leg and connecting the neutral line further comprises opening a first switch between the needed line and the second leg, closing a second switch and opening a third switch to insert the resistor.

12. The dual-voltage generator of claim 11, wherein the step of connecting the second hot line to the second leg further comprises closing a fourth switch between the second hot line and the second leg.

13. The dual-voltage generator of claim 12, wherein:

inserting the resistor between the first line and the first leg further comprises opening the fourth switch, closing the second switch and opening the third switch; and removing the run capacitance comprising a fifth switch.

14. The dual-voltage generator of claim 13, wherein:

connecting the neutral line to the second leg further comprises closing the first switch; and removing the resistor comprises opening the same switch; and inserting the run capacitance further comprises closing the fifth switch.

15. The dual-voltage generator of claim 8, wherein the dual-voltage generator switches between at least two of 120V, 230V, 240V and 460V.

16. The dual-voltage generator of claim 8, wherein the dual-voltage generator is driven by a variable power source.

17. The dual-voltage generator of claim 16, wherein the variable power source is one of a wind turbine, a variable hydroelectric plant or a solar powered generator.

18. In a dual-voltage generator having a first leg always connected to a first hot line and a second leg switched between a second hot line and a neutral line, a method of switching from one voltage to another voltage, the method comprising:

switching from a first voltage to a second voltage by:

inserting a resistor between the first hot line and the first leg;

disconnecting the neutral line from the second leg of the dual-voltage generator;

connecting the second hot line to the second leg after a first period of time; and removing the resistor after a second period of time; and inserting the resistor in between the first hot line and the first leg;

removing a run capacitance between the first hot leg and auxiliary winding;

connecting the neutral line to the second leg after a third period of time;

removing the resistor after a fourth period of time; and inserting the run capacitance back into the system after a fifth period of time.

19. The method of claim 18, wherein the dual-voltage generator is one of a wind turbine, a variable hydroelectric plant, or a solar power generator.

20. A dual-voltage generator comprising:

means for transitioning from a first voltage level to a second voltage level by inserting a first resistance and/or a first capacitance and removing a second resistance and/or a second capacitance according to a timing scheme.

21. A method of switching from one voltage to another voltage in an induction generator/motor, the method comprising:

transitioning between two or more voltage levels by inserting and/or removing resistance and/or capacitance following a systematic timing scheme.

* * * * *